US006442974B1

(12) United States Patent
Paananen et al.

(10) Patent No.: US 6,442,974 B1
(45) Date of Patent: *Sep. 3, 2002

(54) METHOD AND DEVICE FOR MAKING VISUALLY OBSERVABLE MARKINGS ONTO TRANSPARENT MATERIAL

(75) Inventors: Aku Paananen, Helsinki; Juha Liukkonen, Espoo, both of (FI)

(73) Assignee: Laserplus Oy, Riihimaki (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,265

(22) PCT Filed: Mar. 23, 1995

(86) PCT No.: PCT/FI95/00153

§ 371 (c)(1),
(2), (4) Date: Nov. 27, 1996

(87) PCT Pub. No.: WO95/25639

PCT Pub. Date: Sep. 28, 1995

(30) Foreign Application Priority Data

Mar. 24, 1994 (FI) .................................................. 94367

(51) Int. Cl.[7] .............................................. C03C 19/00
(52) U.S. Cl. ...................................... 65/30.13; 65/60.53
(58) Field of Search ........................ 219/121.6, 121.68, 219/121.69, 121.73, 121.84, 121.85; 427/554, 555, 556, 596, 597; 347/224, 225, 262; 264/400; 65/1, 30.13, 60.53

(56) References Cited

U.S. PATENT DOCUMENTS

| 3,745,586 A | * | 7/1973 | Braudy ........................ 347/253 |
| 4,173,672 A | * | 11/1979 | Mannheim ................... 428/203 |
| 4,449,761 A | * | 5/1984 | Davis et al. ................. 312/116 |
| 4,629,859 A | * | 12/1986 | Reddy .................... 219/121.85 |
| 4,737,232 A | | 4/1988 | Flicstein et al. |
| 4,743,463 A | | 5/1988 | Ronn et al. |
| 4,895,735 A | * | 1/1990 | Cook ........................... 427/597 |
| 5,019,440 A | * | 5/1991 | Ogasawara et al. .......... 428/195 |
| 5,171,650 A | * | 12/1992 | Ellis et al. ..................... 430/20 |
| 5,173,441 A | | 12/1992 | Yu et al. |
| 5,424,759 A | * | 6/1995 | Burberry ..................... 347/224 |
| 5,585,153 A | * | 12/1996 | Kamen et al. .............. 428/35.7 |

FOREIGN PATENT DOCUMENTS

| EP | 002738 | | 7/1979 |
| JP | 55-11876 | * | 1/1980 |
| JP | 60-61193 | | 4/1985 |
| JP | 6-8634 | * | 1/1994 |
| WO | WO 90/01418 | | 2/1990 |

* cited by examiner

Primary Examiner—Samuel M. Heinrich
(74) Attorney, Agent, or Firm—Klauber & Jackson

(57) ABSTRACT

The object of the invention is a method and a device for making visually distinguishable markings on the lower surface of a transparent material (5), using a vehicle (1). The marking is provided by causing a mixing of the transparent material and the vehicle by using a laser beam directed through the transparent material. The method can also be used to make markings on laminated glass without damaging the laminate.

18 Claims, 1 Drawing Sheet

Figure 1:
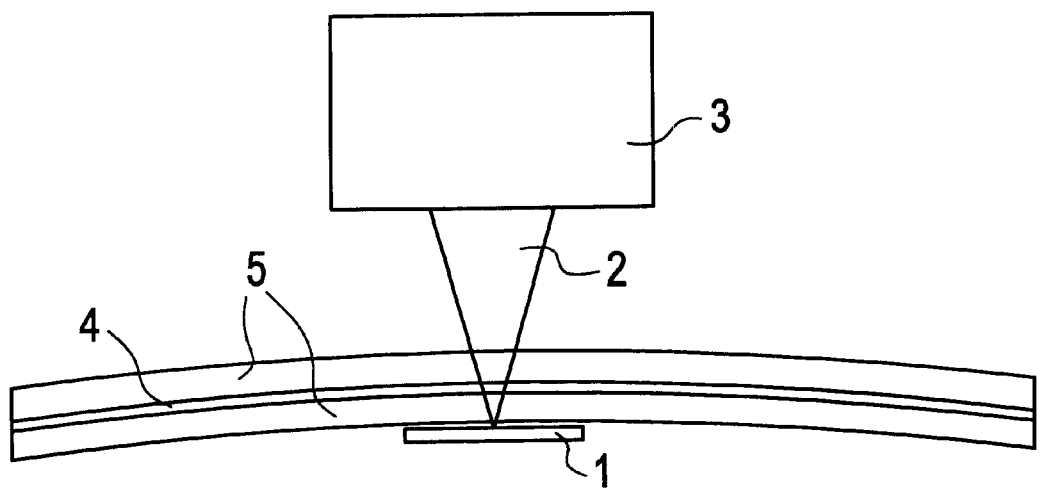

METHOD AND DEVICE FOR MAKING VISUALLY OBSERVABLE MARKINGS ONTO TRANSPARENT MATERIAL

The object of this invention is a method and a device for making visually observable markings onto the surface of glass or other transparent material by using a laser beam. The term transparency implies that the material does not essentially absorb light energy on the wavelength of the laser beam mentioned.

Markings are currently made by, e.g., sand blasting, silk screen printing, transfer marking methods, or the like. The main problem of the methods used has been a difficulty in making individualized glass markings, e.g., serial numbers or changing bar codes in industrial production line applications.

The advantages of laser marking can be considered reliability, stability, convertability and flexibility. The applicability of an Nd/Yag type laser for marking glass has generally been considered weak or nearly nonexistent because light is not absorbed by glass at this wavelength. The Nd/Yag type laser generally refers to a laser in which the laser beam is generated in an artificially grown crystal, i.e., in a laser rod. The wavelength of the Nd/Yag laser is 1064 nm. This wavelength causes the effect of the beam passing through the glass.

Laser marking can be effected either by using a masking technique in which the laser beam does not move and the desired figure is cut or etched on a cover plate, i.e., a mask, or by using oscillating mirrors.

The oscillating mirrors refer to refracting mirrors which are a part of the beam deflection unit of the marking laser and which are moved to deflect the laser beam so that it follows the shapes of the desired marking pattern. The mirrors are controlled by servo motors or galvanometers with the aid of a computer. By using the oscillating mirrors, fairly high speeds of movement of the beam, such as 1500 mm/s, can be achieved.

Laser marking is a frequently used method which has not been applied in glass marking previously, but transparent objects have generally been marked by using traditional means. These methods provide a fairly low marking cycle time. However, there are many production processes which require fast and individualized markings on transparent objects for subsequent identification of the product. There are no laser marking applications for such processes. Furthermore, many marking methods require that the marking is made in a low-pressure chamber.

A laser beam directed through a transparent object and a metal vehicle placed in the vicinity of the surface to be marked has been used, according to EP patent EP 2738, to form coatings or conductive patterns, such as strip conductors, on the surfaces of isolating bodies. The patent deals with a slightly different problem that the present invention as it does not endeavour to achieve a visual distinguishability of a pattern. Copper, brass, chrome, and aluminium are mentioned as vehicles. The patent also assumes that the transparent material is homogenous.

The object of the present invention is a method and a device for making individual and visually distinguishable markings on transparent mediums quickly and advantageously in industrial production line applications. Another object is that the method can be applied for marking laminated glass structures without damaging any parts of the structure.

The method according to the invention is characterized in that the laser beam is conducted through the medium to be marked and focused on the vehicle on the opposite side, such as a colourant body, a metal sheet, or similar film so that a reaction is generated in the vehicle, comprising heating, melting and evaporation, and which causes the creation of a pattern on the surface of the vehicle, a pattern which can be distinguished very well when examined visually. The method is further characterized in that the marking is essentially effected at normal pressure.

The invention is also related to a device for implementing the method. The device according to the invention is characterised in that means are provided on the opposite side of the medium to be marked, with respect to the laser beam, for bringing the vehicle, such as a colourant body, metal sheet or corresponding film to the vicinity of the surface to be marked, the equipment focusing the laser beam against the vehicle. The device is further characterized in that the part of the equipment where the marking is effected is essentially at normal pressure.

It is also possible to make markings by removing some of the vehicle from the surface of the glass. For instance, the black framing part of a windscreen serves as a vehicle and the laser beam is used to make the markings by removing the vehicle.

An essential difference of the present invention as compared with EP 2738 is a realization according to which the amount of the vehicle does not have to be so large that it would constitute an actual coating when making visual markings. In this case the consumption of vehicle is minimum and the whole procedure can be carried out considerably faster than the coating according to EP 2738. The method and device according to the invention has thus been optimized in the manner described below so that the pattern created on the surface of the material to be marked can be distinguished in the best possible way when examined visually, and that the laser beam does not damage the possible intermediate layers of the structure to be marked. There are essential differences in the performance characteristics of the methods. In EP 2738, the power of the laser beam is preferably 2 W and it is preferably moved at a speed of 2 mm/s. In the method according to the present invention the power of the laser beam is preferably 50 W and the speed of movement 250 mm/s.

Different embodiments of the invention are disclosed in the dependent claims.

The invention is described in the following in more detail with reference to an embodiment of the invention schematically illustrated in the appended drawing (individual marking of a windscreen), the intention, however, is not to limit the invention to this embodiment.

The figure illustrates a diagram of the method according to the invention. Reference number 3 is used to mark a laser head, and laser beam 2 coming from the laser head is focused on vehicle 1. Laser beam 2 travels through layers of glass 5 and a laminated layer 4. Vehicle 1 should be placed about 0.1 mm from the lower surface of the glass in order for the mixing of the vehicle and the glass to be effected in the best possible way. The ambient conditions are normal air, pressure, and temperature. The forming of plasma in the vehicle and the adhesion of the marking on the glass surface can also be improved by surrounding the operating range by a gas atmosphere instead of air, such as argon which improves the reaction.

When marking laminated glass structures such as windscreens, it is important that the marking does not damage the laminating layer between the glass layers. Due to the optical characteristics of the laminating material, the laser beam is absorbed into it considerably better than into the glass. The power density of the laminate must be the lowest possible because otherwise the laminate bubbles and breaks the glass or at least weakens its strength. The power density of the laminate is influenced by the power and the optical geometry of the laser beam, i.e., the original diameter of the laser beam and the focal distance of the optics used for focusing. The power density is highest near the focal point of the beam which is situated on the surface of the vehicle, according to the method. The focal point, i.e., the focus, cannot be removed away from the laminate, i.e., below the surface of the vehicle because then the power density in the vehicle, correspondingly, is too low for making the marking.

Examples of the performance values, at which the power density of the laminate can be maintained sufficiently low, are provided below. The tests have been carried out by using the Power Line marking equipment of Rofin Sinar. The power of the equipment is 120 W and the galvohead type RSG 3.

Vehicle 1 must be a kind of mixture the factors of which influencing the markability include, e.g., the melting point, the boiling point, heat transmission, density, etc. On the basis of the tests, suitable vehicles include, e.g., the colouring agent used for silk screen printing dyeing of windscreen surfaces, brass, stainless steel, and zinc aluminium alloys. By further alloying the substances mentioned above by using, e.g., lead, tin, zinc, or the like, the markability can be influenced in a positive way. On the basis of the tests it has been noted that a mixture with a fairly high melting point provides good stability and a mixture with a fairly low melting point provides a good difference in contrast. The mechanical and chemical stabilities of the marking are important regarding the applicability of the method, so that it is not possible to later alter or remove the marking intentionally or unintentionally. The mechanical stability is preferably tested by rubbing the marking with different mediums. The chemical stability is tested by exposing the marking to corrosive and solvent substances.

The best marking result on a glass surface is achieved by using, as the vehicle, a silk screen printing colour which is used by windscreen manufacturers for dyeing the edges of windscreens. Examples are shown in the following for applying the method in different vehicles.

EXAMPLE 1

Marking of a windscreen with a silk screen printing colourant as a vehicle.

Flux: $PbO$ c. 45%, $B_2O_3$ c. 10%, $ZrO_2$ c. 5%, $SiO_i$ c. 35%, $Al_2O_3$ c. 5%

Pigment: $CuO$ 40%, $Fe_2O_5$ 10%, $Cr_2O_3$ 30%, $CoO$ 20%

Focus: 166 mm

Frequency: 3200 Hz

Current: 14 A

Speed: 170 mm/s

The final result: The laminate does not bubble. The darkness of the marking is good. The marking is sharp. The mechanical and chemical stabilities are good. The limits of the performance values (speed and current) are defined by the fact that the power density of the laser beam at the laminate may not be high enough to damage the laminate.

EXAMPLE 2

Marking of a windscreen with stainless steel as the vehicle.

Focus: 166 mm

Frequency: 3200 Hz

Current: 14 A

Speed: 170 mm/s

Conclusion: The laminate does not bubble. The darkness of the marking is reasonably good. The marking is sharp. The mechanical and chemical stabilities are good.

EXAMPLE 3

Marking of a windscreen (light-coloured) with brass as the vehicle.

Focus: 165.5 mm

Frequency: 3000 Hz

Current: 14.75 A

Speed: 200 mm/s

Conclusion: The laminate does not bubble. The tone of the marking is good. The marking is sharp. The mechanical and chemical stabilities are good.

EXAMPLE 4

Marking of a windscreen (dark) with brass as the vehicle.

Focus: 165.1 mm

Frequency: 3000 Hz

Current: 14.5 A

Speed: 200 mm/s

Conclusion: As in Example 3.

EXAMPLE 5

Marking of a windscreen with lead as the vehicle.

Focus: 166 mm

Frequency: 1500 Hz

Current: 10 A

Speed: 170 mm/s

Conclusion: The laminate does not bubble. The darkness of the marking is better than with brass or stainless steel. The marking is not very sharp. The mechanical stability is good, the chemical stability is poor.

The examples mentioned above deal with the marking of windscreens, in which the major problem is caused by the laminating layer between the layers of glass. When marking conventional glass, the focus, current or frequency values do not need to be limited because of the problematic behaviour of the laminate, whereby the final result is even better with respect to its stability, darkness, and sharpness.

This invention can be applied to make markings on glass by using the Nd/Yag type of laser, with the aid of a vehicle, through the glass on the lower surface thereof. Individualized markings of windscreens, for example, such as the production and inspection markings related to the manufacture, as well as the body numbers or license numbers of cars intended for the identification the cars, can be made through the layers of glass and laminate on the lower surface (in the inside) of the windscreen and other glass. Using the present invention, individual markings are typically limited by one marking head (galvohead) in the area of less than 350 mm×350 mm.

The usage possibilities of the method and device described above are not limited to the marking of windscreens, although this embodiment is used as an example to illustrate the application of the invention. The method and the device can be applied in all cases where individual markings should be done on transparent bodies in relatively small areas. In addition to the glass used in cars, trains, airplanes, and other means of transport, the special glass needed in the chemical industry and biotechniques are major areas of application. The above-mentioned matters are also true for individual pieces manufactured on production lines.

What is claimed is:

1. A method for making markings, that are visually observable with bare eyes, on a surface of a material (5) by using a laser beam (2), in which method
   a) the material to be marked does not essentially absorb energy of a laser light of a wavelength of said laser beam; and b) the laser beam (2) is focused, through the material to be marked (4, 5), onto a surface of a vehicle (1) on opposite side material, wherein c) the laser beam (2) causes a reaction in the vehicle, comprising heating, melting and vaporization of the vehicle as well as penetration of detached vehicle atoms and molecules into the material (5) to be marked without damaging said material, such that the vehicle atoms are transferred to said material, resulting in a visually distinguishable mark on it, and d) the marking according to the method is effected essentially at a normal pressure, with a gap of essentially 0.1 mm between the vehicle and the material to be marked.

2. A method according to claim 1, wherein said material to be marked comprises several sheet-like layers which are laminated into an integral structure.

3. A method according to claim 2, wherein a power density of the laser beam on each layer (4, 5) of said laminated material is set lower than a power density that would damage each said layer.

4. A method according to any of claims 1–3, wherein a gas atmosphere is arranged around a marking spot during the marking.

5. A method according to claim 4, wherein said gas atmosphere is essentially argon.

6. A method according to any of claims 1–3, wherein the vehicle is a colourant for silk screen dyeing of glass surface.

7. A method according to any of claims 1 to 3, wherein the vehicle is stainless steel.

8. A method according to claim 4, wherein the vehicle is stainless steel.

9. A method according to claims 1 to 3, wherein the vehicle is brass.

10. A method according to claim 4, wherein the vehicle is brass.

11. A method according to any of claims 1 to 3, wherein the vehicle is lead.

12. A method according to claim 4, wherein the vehicle is lead.

13. A method according to any of claims 1–3, characterized in that a marking head (3) follows the material (5) to be marked by deflecting the beam (2) during the marking.

14. A method for making markings, that are visually observable with bare eyes, on a surface of a material (5) by using a laser beam (2) comprising a power density, in which method a) the material to be marked comprises several sheet-like layers which are laminated into in integral structure, and said material does not essentially absorb energy of a laser light of a wavelength of said laser beam, and b) the laser beam (2) is focused, through the material to be marked (4, 5), onto a surface of a vehicle (1) on opposite side of said material, wherein c) the power density of the laser beam on each layer (4, 5) of said laminated material is lower than a power density that would damage each said layer, and said laser beam (2) causes a reaction in the vehicle, comprising heating, melting and vaporization of the vehicle as well as penetration of detached vehicle atoms and molecules into the material (5) to be marked without damaging said material such that the vehicle atoms are transferred to said material, resulting in a visually distinguishable mark on said material, and d) the marking according to the method is effected essentially at a normal pressure, with a gap of essentially 0.1 mm between the vehicle and the material to be marked.

15. The method of claim 14, wherein the vehicle comprises a colouring agent used for silkscreen printing dyeing of windscreen surfaces.

16. The method of claim 14, wherein the vehicle comprises brass.

17. The method of claim 14, wherein the vehicle comprises stainless steel.

18. The method of claim 14, wherein the vehicle comprises a zinc aluminum alloy.

* * * * *